(No Model.)
L. JOHNSON.
HARROW.
No. 320,067. Patented June 16, 1885.
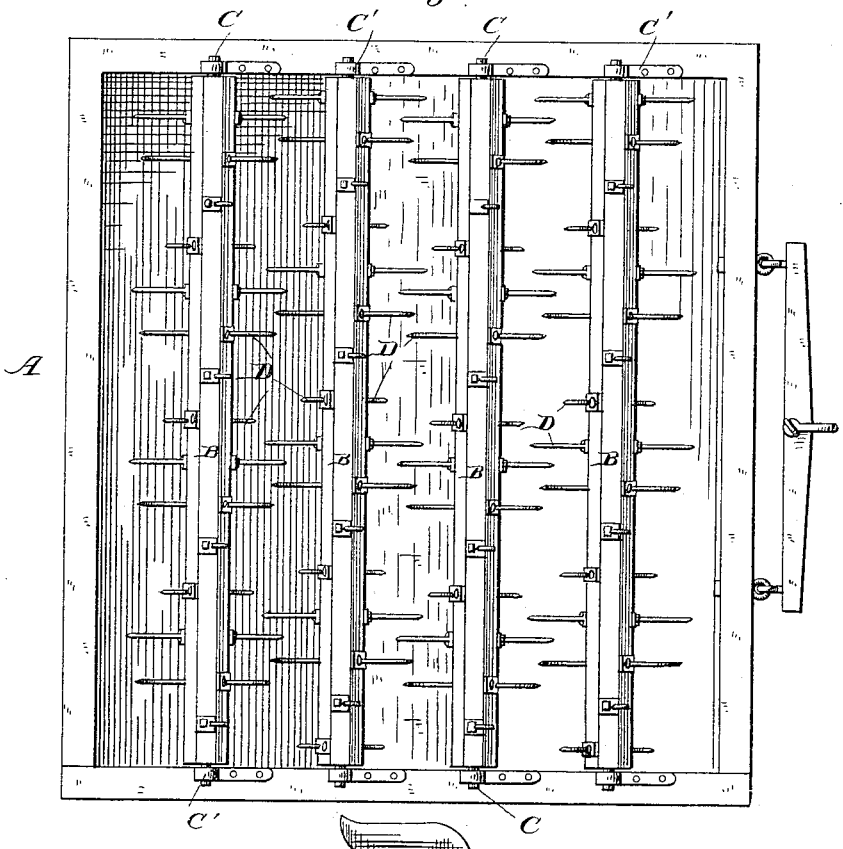
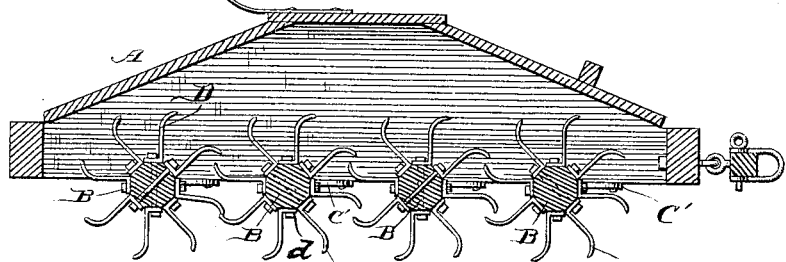
Witnesses:
Inventor
Lewis Johnson

UNITED STATES PATENT OFFICE.

LEWIS JOHNSON, OF OSAKIS, MINNESOTA.

HARROW.

SPECIFICATION forming part of Letters Patent No. 320,067, dated June 16, 1885.

Application filed July 23, 1884. (No model.)

*To all whom it may concern:*

Be it known that I, LEWIS JOHNSON, of Osakis, in the county of Douglas and State of Minnesota, have invented certain new and useful Improvements in Harrows, of which the following is a full, clear, and exact description.

This invention has relation to improvements in harrows; and it consists in the novel construction and arrangement of parts, as will be hereinafter described, and particularly pointed out in the claim.

In the accompanying drawings, Figure 1 is a bottom view of a harrow embodying my invention. Fig. 2 is a side view of the same, partly in section, showing the manner of securing the teeth to the shaft.

The letter A represents the frame, which is of any suitable shape and dimensions, and is suitably and securely fastened together by means of iron bands, bolts, or rivets. The frame, however, is preferably made rectangular in form. Within the frame A is placed a series of revolving shafts, B, made eight-sided or in polygonal form, and they are provided at their ends with bearings C, connected with boxes C' at each end or side of the harrow-frame. These bearings fit loosely in the boxes C', so that the shafts may readily and easily revolve therein.

The construction of all the shafts is similar in all respects, so that the description of one will answer for all.

Each shaft B is provided at suitable intervals apart with teeth D, having bearing-plates $d$ at right angles thereto. These teeth are made of steel, and are pointed at their free ends, while their plates are provided with bolt-holes for a purpose presently explained.

I arrange the teeth spirally upon the shafts and in opposite pairs, and secured in radial positions by passing a single bolt through the bolt-holes of the plates and through holes in the shafts, the bolt-holes in the bearing-plates of the teeth being so arranged with that of the holes of the shafts that one bolt passes through its openings and secures the teeth by means of nuts upon the screw-threaded ends of said bolts.

The hooked or bent portions of the teeth on one flat side are arranged just the reverse of those opposite. The several teeth are so arranged spirally on the shafts that when the harrow is in operation the teeth on each shaft will pass between those on the next cylinder located in front or rear, thereby insuring the passage of two or more teeth at the same time through clods or lumps of earth operated upon, and more perfectly and thoroughly pulverize the same.

The top portion of the frame is covered by boards and slightly elevated, and provided with a spring-seat for the driver, as seen in the drawings. I also provide at the front of the harrow a device for hitching the team thereto. The polygonal form of the shaft gives a fair surface-bearing for the plates $d$, and these bearings, being opposite each other, allow a single bolt to secure two teeth in spiral form without weakening the shaft materially.

What I claim is—

In a harrow, substantially as described, the polygonal shaft combined with teeth D, each having a bearing-plate, $d$, and flattened hook end, arranged spirally upon the shaft and in opposite pairs secured in radial positions, each pair by a single bolt, as set forth.

In testimony whereof I have hereunto set my hand this 1st day of July, 1884.

LEWIS JOHNSON.

Witnesses:
I. M. MADISON,
A. ANDERSON.